United States Patent [19]

Smejkal et al.

[11] 3,710,424

[45] Jan. 16, 1973

[54] BRAKING MEANS FOR A FLEXIBLE CONNECTING ELEMENT WHICH IS RESILIENTLY SUPPORTED AT ONE END AND MAY BE STRESSED IN SHOCKS

[75] Inventors: Hellmuth Smejkal; Walter Schwarz, both of Linz, Austria

[73] Assignee: Vereinigte Osterreichische Eisen - und Stahlwerke Aktiengesellschaft, Linz, Austria

[22] Filed: Aug. 12, 1971

[21] Appl. No.: 171,086

[30] Foreign Application Priority Data

Aug. 18, 1970 Austria.....................................7464

[52] U.S. Cl.............24/123 R, 188/65.1, 266/34 LM
[51] Int. Cl. ..........C21c 7/06, B66d 1/54, B66b 5/02
[58] Field of Search........188/65.1; 267/60; 280/480; 187/71; 266/34 L, 34 LM; 24/123 R

[56] References Cited

UNITED STATES PATENTS 1,384,269  7/1921  Milner...........................267/60 UX
2,477,569  8/1949  Beirise............................280/480 X
3,501,136  3/1970  Schweng et al...................266/34 LM
3,645,519  2/1972  Schwarz et al...................266/34 LM Primary Examiner—Donald A. Griffin
Attorney—Granville M. Brumbaugh et al.

[57] ABSTRACT

The invention relates to a braking means for a flexible connecting element which is resiliently supported at one end and may be stressed in shocks, as used for example for a tackle rope or chain, particularly for the auxiliary rope of a hoist for oxygen blowing lances, comprising an arc-shaped deflection part which is stationary in its circumferential direction over which the connecting element is guided to slide under friction, and two springs for resiliently supporting the connecting element, the springs being arranged one behind the other and having different spring constants, one spring with a smaller spring constant serving for pre-stressing the connecting element, and the other spring with a greater spring constant being pre-stressed and designed for accommodating part of the shock-like stress. Owing to this arrangement it becomes possible to design the springs absorbing the shock in case of a rope rupture relatively small.

6 Claims, 5 Drawing Figures

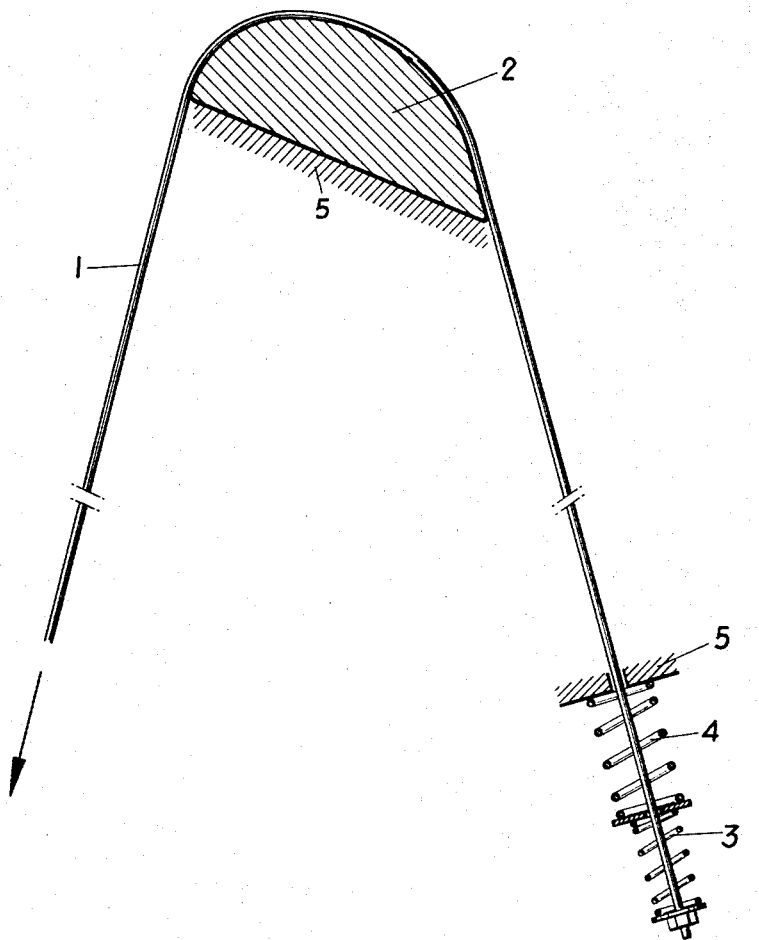

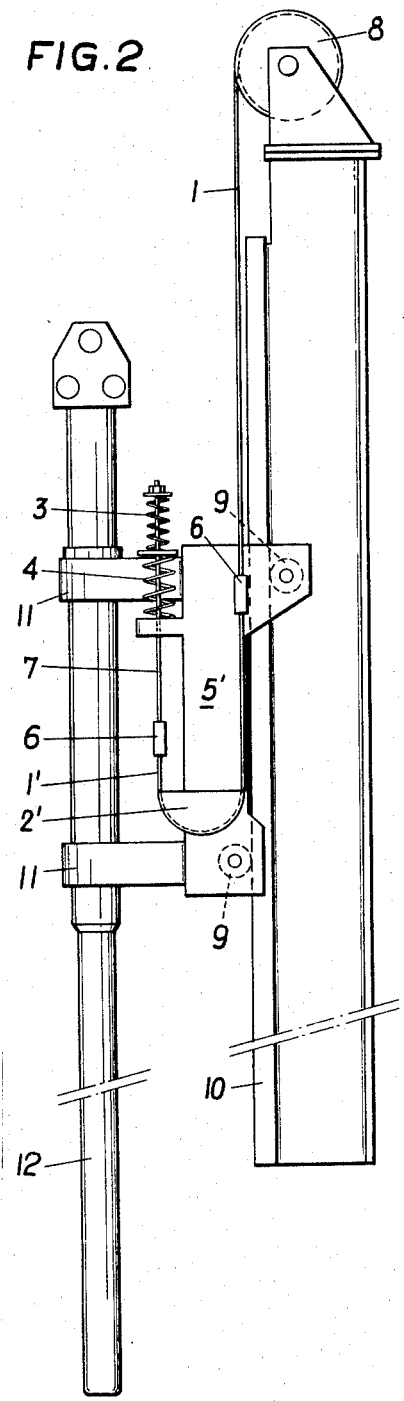
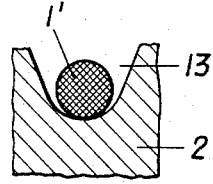
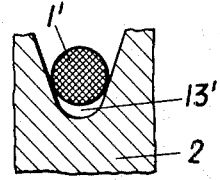
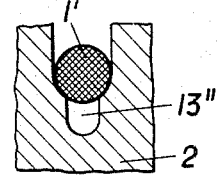

BRAKING MEANS FOR A FLEXIBLE CONNECTING ELEMENT WHICH IS RESILIENTLY SUPPORTED AT ONE END AND MAY BE STRESSED IN SHOCKS

The invention relates to a braking means for a flexible connecting element which is resiliently supported at one end and may be stressed in shocks, as for a rope or chain of a tackle.

In many lifting hoists and in various conveying and transport plants the load hanging on a rope or chain is secured against falling by a further rope or a further chain. It is already known to resiliently support one end of such an auxiliary rope or chain so that it will yield to a degree. Such a resilient support is, for example, described in the Canadian Pat. Specification No. 815.223, British Pat. Specification No. 1.205.976 and American Pat. Specification No. 3.501.136 which relate to a device for lifting and lowering oxygen top blowing lances for converters. There, an operating rope and an auxiliary rope are fixed to the oxygen lance; both ropes run on a single drum and the weight of the lance, in normal operation, is exclusively carried by the operating rope owing to the fact that the auxiliary rope or its deflection means is to a degree resiliently supported. The auxiliary rope is exclusively stressed by the spring force. When the operating rope ruptures, the total load is conveyed to the auxiliary rope in a shock-like manner and the spring is compressed. When a specific spring path is transgressed an end-switch is actuated to switch off the lance lifting motor and for actuating the brakes acting upon the rope drum so that the lance which now hangs on the auxiliary rope comes to a standstill. It is also possible that a second end-switch is provided which is actuated when the spring is released; this will be the case for example when the lance, when it is being lowered into the converter, meets with a solid obstacle and both the operating rope and the auxiliary rope slacken. The shock stress exerted on the auxiliary rope when the operating rope ruptures may be reduced to a tolerable and controllable measure by choosing suitable springs for its resilient support; in order to keep low the shock stress on the auxiliary rope, however, large and heavy springs are necessary which need ample space and in some plants cannot be accommodated. Also, because of long spring paths strong oscillations will occur, which likewise are undesirable. Thus, resilient supports of large dimensions in numerous cases, particularly with great lifting devices for blowing lances have not proved satisfactory. In steel works they are greatly exposed to the influence of heat and dust so that in the course of time the material ages and the spring constant will change.

The invention is aimed at creating a braking means for a flexible connecting element which is resiliently supported at one end and may be stressed in shocks, as for a rope or chain of a lifting hoist so that the springs have to absorb only part of the shock-like stress and may be designed to be relatively small.

According to the invention this aim is achieved in that the connecting element is guided to slide under friction over an arc-shaped deflection part which is stationary in its circumferential direction, e.g., over a stationary drum, and that for the resilient support of the connecting element two springs arranged one behind the other and having different spring constants are provided, the spring with the smaller spring constant serving for prestressing the connecting element and the other spring with the greater spring constant being prestressed and destined for accommodating part of the shock-like stress. The deflection part may be denoted as "braking arc." Owing to the friction occurring between the connecting element and the "braking arc" the major part of the shock energy is cancelled by transformation into heat, the connecting element moving only over a relatively short distance. Accordingly, also the spring path is short. The angle of contact of the connecting element on the "braking arc" may be smaller or greater than 180°; for reasons of simplicity as a rule an angle of 180° is chosen.

According to a preferred embodiment of the invention the connecting element comprises two parts, the part which is guided around the arc-shaped deflection part being releasably connected by means of a coupling with the other part.

The diameter of that part of the connecting element which is guided around the arc-shaped deflection part may be somewhat greater than the diameter of its other part.

Also, the breaking strength of that part of the connecting element which is guided around the arc-shaped deflection part may be greater than that of its other part.

When a rope is used as connecting element the diameter of the individual rope wires of the part guided around the arc-shaped deflection part may be greater than the diameter of the rope wires of the other part.

The braking means according to the invention is preferably used for a resiliently fixed auxiliary rope of a device for lifting and lowering lances for oxygen top blowing converters, in particular for measuring probes for continuously measuring the temperature of hot liquid metal baths, wherein the auxiliary rope and an operating rope preferably run on a single drum and the auxiliary rope in normal operation is solely stressed by the spring force and wherein in case of disturbance the spring deflection in both directions may be used for the formation of a signal.

In order that the invention may be more fully understood, an embodiment thereof shall now be explained with reference to the accompanying drawings.

FIG. 1 schematically shows the principle of the braking means for a flexible connecting element which is resiliently supported at one end and may be stressed in shocks.

FIG. 2 is a lateral view of a device for lifting and lowering lances for oxygen top blowing converters comprising a braking means according to the invention for the resiliently fixed auxiliary rope of this device.

FIG. 3 shows various embodiments of a braking means in cross section.

According to FIG. 1 the flexible connecting element 1 is guided over an arc-shaped deflection part 2 and connected with a spring 3 which abuts against a further spring 4. Numeral 5 denotes support means for the deflection part 2 and the spring 4. The direction in which the traction force occurring in shocks acts is characterized by an arrow. The term "flexible connecting element" as used herein is understood to comprise any kind of ropes, chains and cordage in any embodiment and made of diverse materials, such as steel or hemp. The arc-shaped deflection part 2 may, for example, be a stationary, smooth drum or a drum provided with grooves. The deflection part 2 may be made of steel, wood or a synthetic material, the choice of the material being dependent from the material of the connecting element and from the traction stress. The spring 3 which serves for pre-stressing the connecting element has a smaller spring constant than the spring 4 which is pre-stressed and serves for receiving a part of the shock energy. At first the spring 3 is compressed completely or until a stop, whereupon the spring 4 starts to have an effect. The major part of the shock energy is transformed into heat by the friction between the flexible connecting element 1 and the arc-shaped deflection part 2. A shock-like stress may occur e.g., in hoisting cages in shafts and also in inclined lifts and other transportation plants, no matter whether the load is suspended only on one rope — the operating rope — or on several ropes. Accordingly this building principle may also be used for several ropes which are resiliently supported at one end of a transport or conveying plant.

A preferred field of application are devices for lifting and lowering temperature measuring probes and blowing lances according to FIG. 2. The springs 3,4 are arranged on a liftable and lowerable lance carriage 5' on which also a deflection part 2' is rigidly arranged which is designed as a drum half and is stationary in circumferential direction. The part 1' of the auxiliary rope which is in contact with the deflection part 2' is releasably connected with the other part 1 of the auxiliary rope and also with a rod 7 fixed to the spring 3 via rope couplings 6 so that the rope part 1' may be exchanged alone when it is greatly worn. Numeral 8 denotes a rope drum which is driven by an electromotor and on which apart from the auxiliary rope 1, 1' also an operating rope, not shown in the drawing is running; the operating rope is directly connected with the lance carriage 5', which engages into a lance guide 10 by means of rollers 9. Numerals 11 denote holding means for the blowing lance 12.

FIG. 3 shows various cross sections of a groove worked in the deflection part 2' for guiding the connecting element: FIG. 3a shows a normal groove 13, FIG. 3b shows a wedge groove 13', and FIG. 3c shows an undercut or so-called Heymann groove 13''. In cases where a particularly strong braking effect of the rope 1' is necessary, a groove shape according to FIG. 3b or 3c will be chosen.

What is claimed is:

1. A braking means for a flexible connecting element which is resiliently supported at one end and may be stressed in shocks, comprising an arc-shaped deflection part which is stationary in its circumferential direction over which the connecting element is guided to slide under friction, and two springs for resiliently supporting the connecting element, the springs being arranged one behind the other and having different spring constants, one spring with a smaller spring constant serving for pre-stressing the connecting element, and the other spring with a greater spring constant being pre-stressed and designed for accommodating part of the shock-like stress.

2. The braking means set forth in claim 1, wherein the deflection part is a stationary drum.

3. The braking means set forth in claim 1, wherein the connecting element comprises two parts, the part which is guided around the arc-shaped deflection part being releasably connected by means of a coupling with the other part.

4. The braking means set forth in claim 3, wherein the diameter of the part of the connecting element which is guided around the arc-shaped deflection part is somewhat greater than the diameter of the other part.

5. The braking means set forth in claim 3, wherein the breaking strength of the part of the connecting element which is guided around the arc-shaped deflection part is greater than that of its other part.

6. The braking means set forth in claim 5, wherein when a rope is used as a connecting element, the diameter of the individual rope wires of the part of the connecting element guided around the deflection part is greater than the diameter of the rope wires of the other part.

* * * * *

UNITED STATES PATENT OFFICE
CERTIFICATE OF CORRECTION

PO-1050
(5/69)

Patent No. 3,710,424      Dated Jan. 16, 1973

Inventor(s) Hellmuth Smejkal et al

It is certified that error appears in the above-identified patent and that said Letters Patent are hereby corrected as shown below:

Col. 1, line 16, "815,223" should be --835,223--.

Signed and sealed this 29th day of May 1973.

(SEAL)
Attest:

EDWARD M. FLETCHER, JR.         ROBERT GOTTSCHALK
Attesting Officer               Commissioner of Patents